Feb. 2, 1965
W. STELZER
3,168,352
TRACTOR TRAILER BRAKE SYSTEM
Filed Aug. 9, 1961
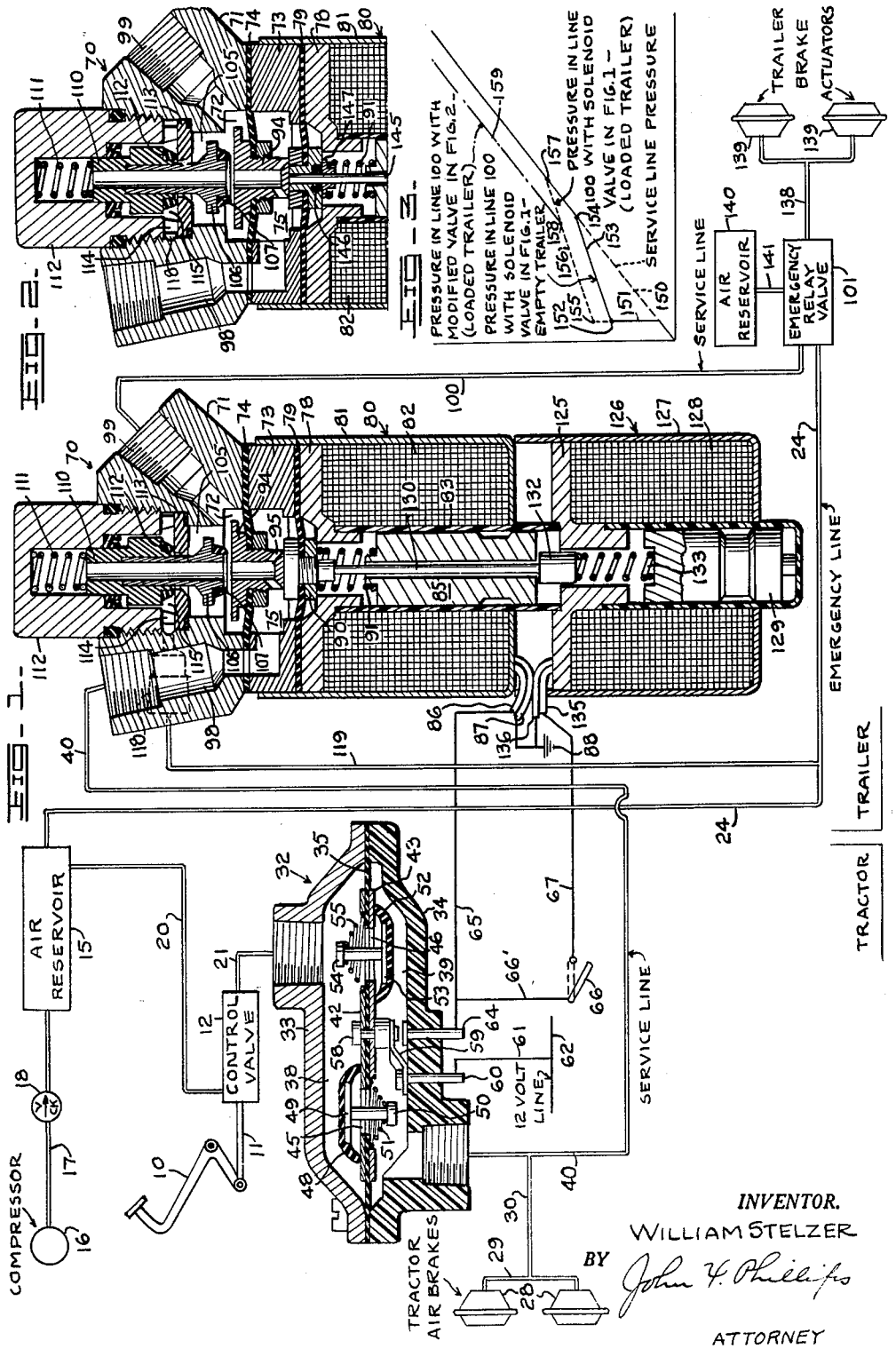
INVENTOR.
WILLIAM STELZER
BY John F. Phillips
ATTORNEY United States Patent Office 3,168,352
Patented Feb. 2, 1965

1

3,168,352
TRACTOR TRAILER BRAKE SYSTEM
William Stelzer, Bloomfield Hills, Mich., assignor to Kelsey-Hayes Company, Romulus, Mich., a corporation of Delaware
Filed Aug. 9, 1961, Ser. No. 130,360
17 Claims. (Cl. 303—7)

This invention relates to a tractor trailer brake system and is an improvement over prior structures such as that shown in my prior Patent No. 2,941,844, granted June 21, 1960.

Numerous efforts have been made in tractor trailer brake systems to provide means whereby the operator, in depressing the brake pedal, could apply the trailer brakes ahead of the tractor brakes to prevent jack-knifing of the tractor trailer combination, as frequently occurs. Moreover, it is desirable to provide some means whereby a slight depression of the brake pedal would snub the trailer brakes without applying the tractor brakes, which operation is usually performed by the manual operation of a hand valve, operable wholly independently of the brake pedal. The system in my prior patent admirably performs the desired functions referred to, but the present system is advantageous over the prior system for a number of reasons which will be referred to below.

An important object of the invention is to utilize a weak signal from the foot valve to close a switch to energize a solenoid valve to transmit air pressure to the trailer brakes via the usual emergency relay valve, the benefits derived from such an operation being a speed-up in trailer brake actuation and the preventing of possible jack-knifing.

A further object is to provide a system of the character referred to wherein the brake pedal is operable to produce a snubbing action of the trailer brakes without applying the tractor brakes.

A further object is to induce a predetermined control pressure in the trailer air brake system in advance of the control pressure transmitted through the service line from the tractor braking system, and to gradually increase the trailer brake control pressure as the control pressure from the tractor increases, until both pressures are the same.

A further object is to provide in combination with the system referred to manually operable means which functions to increase the braking pressure for the trailer when the latter is loaded.

A further object is to provide a novel and highly sensitive switch operable upon initial movement of the brake pedal for energizing the solenoid which effects initial application of the trailer brakes whereby the latter operation may be performed without application of the tractor brakes.

A further object is to provide in a mechanism of this character a solenoid operated valve, controlled by the brake pedal, to supply trailer braking pressures upon initial movement of the brake pedal and to provide novel means whereby, when service line pressure to the trailer increases to a predetermined point, pressure responsive means associated with the solenoid valve causes the latter to cease functionnig so that service line pressures take over the controlling of the trailer brakes so that application of the latter is proportional to application of the tractor brakes.

A further object is to provide a system of the character just referred to provided with novel means for assisting the solenoid in its operation so that greater service line pressure is necessary to cause the solenoid to cease operating, thus providing means for increasing trailer brake operation with relation to, but still proportional to, tractor brake operation when the trailer is loaded.

Other objects and advantages of the invention will be-

2 come apparent during the course of the following description.

In the drawing I have shown one embodiment of the invention. In this showing

FIGURE 1 is a diagrammatic view illustrating the entire system, the solenoid valve mechanism and control switch mechanism being structurally shown in section, FIGURE 2 is a fragmentary sectional view showing a modified form of load control means associated with the solenoid valve, and FIGURE 3 is a graph illustrating relative braking pressures under different conditions.

Referring to FIGURE 1, the numeral 10 designates the usual brake pedal connected by a rod 11 to a follow-up control valve mechanism 12 of conventional type, the operation of which by the brake pedal controls the application of the tractor and trailer brakes as described in detail below.

The present mechanism is shown as a super-atmospheric pressure operated system, and to this end, the tractor is provided with an air reservoir 15 in which air is maintained under predetermined pressure by operation of a compressor 16, piped to the reservoir as at 17. A conventional check valve 18 is arranged in the line 17. Pressure is supplied from the reservoir 15 to the control valve mechanism 12 through a line 20, and operation of the brake pedal 10 supplies pressure from the control valve for the operation of the system through a pipe or conduit 21. From the reservoir 15, an emergency fluid pressure line 24 extends rearwardly to the trailer for a purpose which will become apparent.

The tractor brakes are actuated by air pressure motors 28 and air is supplied to these motors by branched pipes 29 to which fluid pressure is supplied through a pipe 30. The controlling of the supplying of pressure from the pipe 21 to the pipe 30 takes place through the medium of a novel pressure operated switch mechanism indicated as a whole by the numeral 32.

The switch mechanism 32 comprises casing sections 33 and 34 having a rubber or similar highly flexible diaphragm 35 clamped therebetween. The diaphragm 35 divides the casing to form chambers 38 and 39, the former of which communicates with the pipe 21 to receive pressure from the control valve 12. The chamber 39 is connected to one end of a pipe 40 to which the pipe 30 is connected, and the pipe 40 extends rearwardly to the trailer for a purpose to be described. The diaphragm 35, within the switch casing, is clamped between plates 42 and 43, and these plates and the diaphragm 35 are apertured as at 45 and 46 to afford communication between the chambers 38 and 39 under proper conditions.

The aperture 45 is normally closed by a rubber or similar resilient valve 48 bonded to a head 49 to which is connected a headed stem 50, and a very light spring 51 normally seats the valve 48. Similarly, the aperture 46 is normally closed by a resilient valve 52 bonded to a head 53 carrying a headed stem 54, and a very light spring 55 normally seats valve 52.

The diaphragm 35 and plates 42 and 43 are clamped together by a central post 58, the lower end of which engages a resilient switch arm 59 fixed in position to the casing section 34 by a contact stem 60 extending through and secured in any suitable manner to the casing section 34. It will be noted that this casing section is formed of insulating material. The contact post 60 is connected by a wire 61 to the 12 volt line 62 of the tractor. The resilient switch arm 59, upon downward movement of the diaphragm 35, is engageable with a contact post 64 to which is connected one end of a wire 65 leading rearwardly to the trailer. A wire 66' is tapped at one end into the wire 65 and leads to a manually controllable switch 66, adapted when in the closed dotted line position, to electrically connect the wire 65 to a wire 67 leading rearwardly to the trailer. As will become apparent, the switch 66 is open when the trailer is running light or relatively lightly loaded, and is closed when the trailer is relatively heavily loaded.

An electrically operable valve mechanism, indicated as a whole by the numeral 70, is mounted on the trailer. This valve mechanism comprises a preferably die cast body 71 having a chamber 72 therein. The body 71 is clamped to a circular spacer plate 73, and a diaphragm 74 is clamped between the members 71 and 73. The diaphragm 74 has one face exposed to pressure in the chamber 72 and its other face exposed to pressure in a chamber 75 formed in the spacer 73.

Another spacer 78 is clamped to the spacer 73 with a diaphragm 79 clamped therebetween, and the spacer 78 forms the base plate of a solenoid 80 having a shell 81, coil 82 and cylindrical core 83. The solenoid 80 is provided with an armature 85 movable upwardly upon energization of the solenoid, as will become apparent. One end of the coil of the solenoid, indicated by the wire 86, is connected to one end of the wire 65. The other end of the solenoid coil, indicated by the wire 87, is connected to a ground 88. Therefore, it will be apparent that when the switch 59 is moved downwardly to engage the contact 64, the solenoid 80 will be energized. A nut and screw combination 90 is clamped to the diaphragm 79 centrally thereof, and a spring 91 engages at opposite ends against the nut and screw combination and against the armature 85 so that upon energization of solenoid 80, the force of the armature 85 will be resiliently transmitted to the center of the diaphragm 79 to move it upwardly.

An axially bored thimble 94 is clamped against the central portion of the diaphragm 74 and has its axial bore communicating with the chamber 75 through ports 95. Thus, it will be apparent that the chambers 72 and 75 are adapted to normally communicate with each other so that pressures are balanced therein. The chamber 75 communicates through suitable porting 98 with the other end of the fluid line 40. The chamber 72 communicates through suitable porting 99 with one end of a fluid line 100, the other end of which is connected to the trailer emergency relay valve 101. The emergency line 24 is also connected to the emergency relay valve 101 for the conventional purpose.

The body 70 is provided therein with a chamber 105 in fixed communication with the chamber 72. A valve stem 106 carries an annular resilient valve 107 normally disengaged from, but movable downwardly into, engagement with the thimble 94 to close the axial passage therethrough to the chamber 72.

The valve stem 106 is carried by a plunger 110 biased downwardly by a spring 111 mounted in a plug 112 in which the plunger 110 is slidable. The plunger 110 carries at its lower end a resilient valve 112 engageable with a centrally apertured plate 113 mounted in the body 70. This plate is maintained in sealed engagement with the body 70 by fingers 114 carried by the plug 112. Above the plate 113 is formed a chamber 115 normally closed to communication with the chamber 105 through the axial passage through the plate 113 by the normally closed valve 112. When the parts are in the normal positions shown in FIGURE 1, therefore, it will be apparent that the chambers 105, 72 and 75 are in communication with each other. The chamber 115 communicates through suitable porting 118 with one end of a pipe line 119 having its other end connected to the emergency line 24.

The core 83 is connected to the end plate 125 of a second solenoid 126 having a shell 127, coil 128 and armature 129. The armature 85 of the solenoid 80 has an axial bore through which extends a stem 130, the upper end of which abuts the screw and nut combination 90. The other end of the stem 130 is provided with a head 132. One end of a spring 133 engages the head 132 and has its other end seating against the armature 129. Thus, it will be apparent that when both solenoids are energized, the spring 91 transmits force from the armature 85 to the diaphragm 79, while the spring 133 transmits force from the armature 129 to the diaphragm 79 through the stem 130. One end of the coil 128, represented by the wire 135, is connected to the wire 67, while the other end of the coil 128, represented by the wire 136, is connected to the ground 88.

The mechanism just described functions to control the emergency valve 101 to supply pressure through lines 138 to the pressure operated trailer brake actuators 139. Emergency pressure for operating these brakes is supplied from an air reservoir 140, maintained in any conventional manner under the proper pressure. This reservoir 140 is connected by line 141 to the emergency relay valve 101 so that in the event the emergency line 24 breaks, pressure is supplied from the reservoir 140, through the emergency relay valve 101, to operate the trailer brake actuators 139. Normally, pressure from the emergency line 24 operates the actuators 139 under the control of the line 100.

A slightly modified type of solenoid valve mechanism is illustrated in FIGURE 2. Most of the parts are identical with the parts shown in FIGURE 1 and have been indicated by the same reference numerals. The only difference in the two constructions lies in the fact that whereas the rod 130 in FIGURE 2 engages the screw and nut combination 90, the corresponding stem 145 in FIGURE 2 passes through the screw and nut combination 90 and engages the thimble 94, the upper end of which forms a seat for the valve 107. Where the stem 145 passes through the screw and nut combination 90, it is sealed by an O-ring 146 to prevent leakage from the chamber 75 into the space beneath the center of the diaphragm 79, which space is open to the atmosphere. In this case, moreover, the spring 91 has its upper end engaging a spring seat 147 which acts to retain the O-ring 146 in position.

The graph in FIGURE 3 illustrates relative pressures supplied to the trailer brake actuators 139 under different operating conditions. The line 150 indicates progressively increasing pressures in the service line 40. The operation of the present mechanism is such that upon the closing of the switch 59, pressure in the rear service line 100 increases abruptly as indicated by the line 151, thus supplying substantial pressure to the trailer brake actuators 139 before the tractor brake actuators 28 are energized, or are energized to an appreciable extent. From the point 152, pressure in line 100 progressively increases as at 153, but at a rate lower than the rate of increase in service line pressure as represented by the line 150. This progressive relatively low rate of increase in the line 100 reaches the point where the pressure in such line coincides with the service line pressure 150, for example, at the point 154. From this point on, service line pressures will coincide with pressures supplied to the tractor brake actuators 28, throughout the remaining range of brake operation. This is the operation which takes place with the form of the invention shown in FIGURE 1 and without the operation of solenoid 126.

As further described below, when the solenoid 126 is energized, the abrupt increase in trailer brake application, as represented by the line 151, does not stop at the point 152 but continues to the point 155, and from this point pressure supplied to the trailer brake actuators 139 will increase as indicated by the line 156. Again this rate of increase is less than the rate of increase in service line pressure, and these pressures will coincide when the point 157 is reached. From this point on, service line pressures will take over the operation of the solenoid valve mechanism in FIGURE 1 throughout the remainder of the brake operation.

When the form of the invention shown in FIGURE 2 is employed, the same operation just described will take will be vented together with the chambers 72 and 105. Thus, the line 100 will be opened to the line 40 and the entire service line will be vented for the return of the valve parts in FIGURE 1 to their normal positions.

The foregoing operations occur if the circuit for the solenoid 126 remains open. This is the operation which takes place if the trailer is carrying no more than a light load. If the trailer is loaded, the operator will close the switch 66, and a circuit parallel to the circuit for the solenoid 80 will be closed through the solenoid 126. In such case, the armature 129 will move upwardly to place the normally unloaded spring 133 under a load to exert an upward force through the stem 130. This stem 130 abuts at its upper end against the screw and nut 90, and the force of the spring 133 will aid the spring 91 in exerting an upward force against the members 90, 94 and 106 to open the valve 112, and a greater counterbalancing force namely pressure in the chamber 72, will be necessary to close the valve 112 in accordance with the foregoing operation.

Accordingly, the effective pressure for controlling the trailer brake actuators 139 will not stop at the point 152 but will continue their abrupt rise to the point 155, whereupon the counteracting pressure acting downwardly on the diaphragm 74 will become effective to allow the valve 112 to seat and thus cut off further admission of air into the chamber 115. From the point 155 on, the pressure in the line 100 will increase as at 156 (FIGURE 3) but again at a rate lower than the rate of increase in pressure in the service line until the point 157 is reached. Under conditions where the solenoid 126 is energized, therefore, a greater trailer brake actuation will occur, as indicated by the line 156, than will occur as indicated by the line 153 when the solenoid 126 is not energized. The valve mechanism thus provides greater trailer brake actuation in initial stages of brake operation when the vehicle is loaded and the switch 66 is closed, than otherwise would occur.

The form of the invention shown in FIGURE 2 operates in the same manner as the form of the invention shown in FIGURE 1, except that it provides a higher but proportionate degree of trailer brake application throughout the range of brake operation. In the modified form, the boost produced by the solenoid 126 is embodied throughout the entire range of operation. The reason for this is that the force of the spring 133 is transmitted directly to the thimble 94 to result in an increase in pressure in the chamber 105 before the valve 112 will close. When the brake pedal is released, the application previously described takes place except that during the releasing of pressure from the service line, there will be an immediate or at least extremely rapid drop in pressure in the service line upon the opening of the valve 48. If it is not desired to cut out the boost in trailer brake application during the release of the trailer brakes, then the leads 66' and 65 should be connected to the conventional tractor stop light switch instead of to the air operated switch 32.

From the foregoing, it will be apparent that the present system operates very effectively to provide a controlled application of the trailer brakes ahead of application of the tractor brakes. When the brake pedal is only slightly depressed, only the trailer brakes will be applied and the maximum pressure will be controlled in accordance with the pressure regulating valve characteristics of the mechanism as described above. Such characteristics of the valve mechanism are subject to control by operation of the solenoid 80 to provide the rapid response of the trailer brakes to brake pedal operation, and the solenoid 126 combines its operation with that of the solenoid 80 where a higher degree of trailer braking is desired when the trailer is heavily loaded. In the form of the invention shown in FIGURE 1 the extra trailer braking will occur when the switch 66 is closed, but the emergency relay valve 101 and the tractor brake actuators 139 will both be subject to service line pressures beyond the point 157 (FIGURE 3). If heavier trailer braking is desired throughout the range of brake operation, the form of the invention shown in FIGURE 2 will be employed. Under such conditions, trailer brake actuation will be proportional to tractor brake actuation, but will be relatively heavier as indicated by the line 159 in FIGURE 3, than is true in the form of the invention shown in FIGURE 1.

The novel switch mechanism 32 forms per se no part of the present invention, and is disclosed and claimed in my copending application, Serial No. 130,344, filed Aug. 9, 1961.

It is to be understood that the form of the invention herewith shown and described is to be taken as a preferred example of the same and that various changes in the shape, size and arrangement of parts may be made as do not depart from the spirit of the invention or the scope of the appended claims.

I claim:

1. In a tractor trailer brake system, manually operable control valve means for supplying fluid pressure to the actuators for the tractor brakes, a service line having a forward end connected to be supplied with pressure from said control valve means upon operation thereof, said service line having a rear end on the trailer, means connected to the rear end of said service line to be operated by pressure therein to operate the trailer brake actuators in proportion to the degree of such pressure, and an automatic valve mechanism connected in said service line between the ends thereof, said automatic valve mechanism comprising a body having a pressure chamber connected to a source of pressure, said valve mechanism having a duct therethrough normally affording communication between said ends of said service line, a normally closed valve disconnecting said pressure chamber from said duct, a normally open valve in said duct connected to said normally closed valve, a valve seat movable in one direction to engage said normally open valve to close said duct and to transmit movement from such valve to said normally closed valve to open it and supply pressure from said pressure chamber to the rear end of said service line, and a solenoid having an armature mechanically connected to said valve seat whereby said solenoid is energizable to move said valve seat to close said normally open valve and open said normally closed valve to cut off communication through said duct and admit pressure to the rear end of said service line, said solenoid having a circuit including a switch arranged to be closed upon initial operation of said control valve means.

2. In a tractor trailer brake system, manually operable control valve means for supplying fluid pressure to the actuators for the tractor brakes, a service line having a forward end connected to be supplied with pressure from said control valve means upon operation thereof, said service line having a rear end on the trailer, means connected to the rear end of said service line to be operated by pressure therein to operate the trailer brake actuators in proportion to the degree of such pressure, and an automatic valve mechanism connected between said forward and rearward ends of said service line, said valve mechanism having a first chamber connected to the forward end of said service line and a second chamber connected to the rear end of said service line, a pressure responsive element between said chambers having a duct normally communicating between said chambers, a normally open valve for said duct in said second chamber, means comprising a solenoid having an armature and including a resilient device engageable with said armature, said solenoid being energizable upon initial operation of said control valve means for transmitting a mechanical force through said resilient device to said pressure responsive element to close said normally open valve and to open said second chamber to a source of pressure, pressure from said source acting on said pressure responsive element in opposition to said resilient device whereby, when presplace except that pressure, as indicated by the line 156 in FIGURE 3, will not continue to the point 157 to come into coincidence with service line pressures, but will continue only to the point 158 from which point on trailer brake pressures will continue to rise throughout the remainder of the brake operation as indicated by the line 159, the pressure from the point 158 on, therefore, being above pressures which would be supplied to the trailer brake actuators 139 in accordance with service line pressures. Thus, the form of the invention shown in FIGURE 2 provides a relatively high degree of trailer brake actuation when the vehicle is heavily loaded.

*Operation*

The valve device 32 is arranged as closely as possible to the control valve 12 to eliminate any lag in the operation of the valve device 32 upon initial brake pedal operation.

In the form of the invention shown in FIGURE 1, all of the parts are shown in normal positions. If it is desired to snub the trailer brakes, the operator will very slightly depress the brake pedal 10 to admit only enough air under pressure through line 21 to the chamber 38 to slightly raise the pressure therein. Because of the area thereof, the diaphragm 35 will be actuated by a very slight increase in pressure in the chamber 38 to close the switch 59 without opening the valve 52. Thus, no pressure will flow into the chamber 39 and the tractor brakes will not be operated. The spring 55 is very light, but even so, it is sufficient to maintain a pressure differential between the chambers 38 and 39 to operate the switch 59. If the valve 52 opens at all, it will be only slightly cracked and insufficient pressure will be supplied to the tractor brake actuators 28 to effect any appreciable application of the tractor brakes.

The operation now being described takes place assuming that the switch 66 is in open position with the trailer running light or lightly loaded.

The closing of the switch 59, therefore, will not energize the solenoid 126. However, a circuit will be closed through the switch 59, wire 65, solenoid 80 and ground 88. Thus, the armature 85 will move upwardly and transmit force through the spring 91, and the screw and nut 90 will be moved upwardly to elevate the thimble 94. The upper face of this thimble forms a valve seat for the valve 107, and upward movement of such seat effects closing of the valve 107, thus disconnecting the chamber 72 from the chamber 75. The valve stem 106 will be then slightly raised to open the valve 112, whereupon pressure from the emergency line 24 will flow through line 119 into the chamber 115, thence, into chamber 105 and through porting 99 through the rear service line 100 to the emergency relay valve 101 to operate this valve and supply pressure from the emergency line 24 to the trailer brake actuators 139 to snub the trailer brakes. This is the operation represented by the line 151 in FIGURE 3.

The force exerted by the armature 85 is limited to the force transmitted by the spring 91, which is normally fully extended. Upward movement of the armature to compress the spring 91 is limited by the flange of the plate 78 projecting downwardly into the core 83. Acting against such spring force at this time will be pressure supplied from the line 119 to the chamber 115 and then downwardly around the stem 106, such pressure acting downwardly on the diaphragm 74. Therefore, when a certain pressure is reached in the chamber 72, the force against the diaphragm 74 causes the spring 91 to yield allowing the valve 112 to close and thus disconnect the chamber 115 from the chamber 72. As further described below, the valve 112, diaphragm 74 and spring 91 together form a pressure regulator to keep the initial pressure supplied through line 100 at a predetermined level, and the pressure transmitted to the emergency relay valve 101 causes the latter to apply the trailer brakes proportional to the magnitude of the signal transmitted through the line 40.

Assuming that brake pedal operation is continued beyond the point referred to above, the admission of pressure to the chamber 38 will open the valve 52, thus admitting pressure to the chamber 39, and to the lines 40, 30, and 29. Accordingly, the tractor brakes will be applied in accordance with pressures supplied to the chamber 39 by operation of the control valve 12. Pressure admitted to the line 40 will flow into the chamber 75. Due to the length of the line 40, pressure will increase in the chamber 75 after some slight lag which will not, however, have delayed the application of the trailer brakes in the manner described above.

Any pressure increase in the chamber 75 has the effect of augmenting the force of the spring 91 because of the difference in the areas of the diaphragms 74 and 79 exposed to the chamber 75. In other words, since the diaphragm 74 has a slightly larger effective area than the diaphragm 79, there will be a net effective force acting upwardly to augment the force of the spring 91. Thus, greater pressure is required in the chamber 72 from the pressure line 119 to overcome the combined pressure and spring forces acting upwardly on the seat of the valve 107. Accordingly, there will be a progressive increase in pressure in the line 100, above that which is supplied for the snubbing of the trailer brakes, before the pressure acting downwardly on the diaphragm 74 allows the valve 112 to close. This progressive increase in pressure supplied to the line 100 is represented by the line 153 in FIGURE 3, the rate of pressure increase being less than the rate of increase in the service line 40 as represented by the line 150. At the point 154 in FIGURE 3, the pressure in the service line 40 will coincide with pressure in the rear end 100 of the service line and from this point on, pressure corresponding to service line pressures in line 40 will control the emergency relay valve 101. From the point 154 onward throughout the range of brake application, therefore, pressures remain equalized in the chambers 72 and 75.

It will be apparent that the valve seat 94 engages the valve 107 at the proper time to cut off communication between the pressure line 119 and the line 100. If pressure should build up slightly in the chamber 105, such pressure, acting downwardly on the diaphragm 74, will crack the valve 107. On the other hand, if pressure in the chamber 105 drops slightly, the net pressure acting upwardly on the diaphragm 74 from the chamber 75 will slightly elevate the valve stem 106 to crack the valve 112 and admit additional pressure from the chamber 115 to the chamber 105. When this pressure reaches the proper point, the diaphragm 74 will move downwardly to allow the valve 112 to again close. Thus for any given position of the brake pedal, the mechanism just described acts as a pressure regulating mechanism. It also will be apparent that if the operator backs off on the brake pedal to lessen the braking, a drop in pressure in the service line 40 renders pressure in the chamber 72 effective for cracking the valve 107 to exhaust the excess pressure from the chamber 72 to the chamber 75. Conversely, if the operator depresses the pedal 10 to a greater extent for increased braking, there will be a corresponding increase in pressure in the chamber 75 to lift the diaphragm 74 and valve stem 106 to admit more pressure from the chamber 115 into the chamber 105, and accordingly pressure in the line 100 will increase to the same extent as pressure in the line 40 to provide greater trailer brake actuation.

If the operator now releases the brake pedal, the control valve 12 cuts off communication between the lines 20 and 21. The valve 48 will now open to permit the escape of pressure from the lines 30 and 40 to the chamber 38 and thus to the control valve 12 to be vented to the atmosphere. The line 40 having been opened to atmosphere and the circuit for the solenoid 80 having been broken by opening the switch 59, the chamber 75 sure in said second chamber reaches a predetermined point, said pressure responsive element will move against said resilient device and said normally open valve will move therewith to close communication between said second chamber and said source.

3. A system according to claim 2 provided with manually controllable means for adding to the force of said resilient device tending to maintain said normally open valve closed and to maintain communication between said second chamber and said source whereby greater pressure will be required in said second chamber acting against said resilient device and said last named means before communication between said last named chamber and said source will be cut off.

4. In a tractor trailer brake system, manually operable control valve means for supplying fluid pressure to the actuators for the tractor brakes, a service line having a forward end connected to be supplied with pressure from said control valve means upon operation thereof, said service line having a rear end on the trailer, means connected to the rear end of said service line to be operated by pressure therein to operate the trailer brake actuators in proportion to the degree of such pressure, and an automatic valve mechanism comprising a body having a first chamber connected to the forward end of said service line and a second chamber connected to the rear end of said service line, a pressure responsive element connected between said chambers and having a duct normally connecting said chambers for the normal communication of the forward and rear ends of said service line, said duct being provided in said second chamber with a valve seat, a normally open valve engageable with said seat, a pressure chamber connected to a source of pressure, a normally closed pressure valve between said pressure chamber and said second chamber and connected to said normally open valve whereby movement of the latter by engagement of said seat therewith opens said pressure valve, a resilient device engaging said pressure responsive element, and means connected to said control valve means to be operated upon initial operation thereof for applying a direct mechanical force to said resilient means and through such resilient means to said pressure responsive element to engage said seat with said normally open valve and to move said pressure valve to open said pressure chamber to said second chamber, pressure in said second chamber from said source acting in opposition to said force applying means whereby, when pressure in said second chamber reaches a predetermined point, said pressure responsive device will be moved against said force applying means and said pressure valve will close to cut off communication between said pressure chamber and said second chamber.

5. A system according to claim 4 wherein said force applying means comprises a solenoid having an armature, said resilient device comprising a spring engaging at one end against said armature and having its other end arranged to transmit force to said pressure responsive element, and a circuit for said solenoid including a switch arranged to be closed upon initial operation of said control valve means.

6. A system according to claim 4 comprising resilient means connected to be operated by said control valve means upon initial operation thereof to add to the force of said resilient device whereby greater pressure in said second chamber will be required before moving said pressure responsive element to close said pressure valve to thus provide increased pressure in the rear end of said service line.

7. A system according to claim 4 provided with a solenoid having an armature and a resilient means connected between and engaging said armature and said pressure responsive element to add to the force of said force applying means tending to maintain said pressure valve open whereby a greater pressure will be required in said second chamber before said pressure valve will close.

8. A system according to claim 4 wherein said force applying means comprises a first solenoid having an armature, said resilient device comprising a spring engaging said armature and connected for applying a force to said pressure responsive element, a circuit for said solenoid comprising a switch arranged to be closed upon initial operation of said control valve means, a second solenoid comprising an armature and resilient means connected to supplement the force of said resilient device transmitted to said pressure responsive element whereby greater pressure will be required in said second chamber for the closing of said pressure valve, and a circuit for said second solenoid including a manually operable switch.

9. In a tractor trailer brake system, manually operable control valve means for supplying fluid pressure to the actuators for the tractor brakes, a service line having a forward end connected to be supplied with pressure from said control valve means upon operation thereof, said service line having a rear end on the trailer, means connected to the rear end of said service line to be operated by pressure therein to operate the trailer brake actuators in proportion to the degree of such pressure, and an automatic valve mechanism comprising a body having a first chamber connected to the forward end of said service line and a second chamber connected to the rear end of said service line, a pressure responsive diaphragm between said chambers, a thimble connected to said diaphragm and provided with a duct normally connecting said chambers, a pressure chamber connected to a pressure source and having a valve seat adapted to communicate between said pressure chamber and said second chamber, a pair of valves fixed to each other, one being a normally open valve in said second chamber engageable with said thimble to close said duct, the other valve being in said pressure chamber and being normally closed, and a solenoid energizable upon initial operation of said control valve means and having an armature mechanically engaging said thimble for moving said thimble to close said first valve and open said other valve whereby communication between said first and second chambers will be closed and said pressure chamber will be opened to said second chamber to admit pressure to said rear end of said service line.

10. A system according to claim 9 provided with a solenoid energizable upon initial operation of said control valve means, said solenoid having an armature, and a spring arranged between said armature and said thimble to resiliently transmit force to said thimble upon energization of said solenoid to close said one valve and open said other valve.

11. A system according to claim 9 provided with a solenoid energizable upon initial operation of said control valve means, said solenoid having an armature, and a spring arranged between said armature and said thimble to resiliently transmit force to said thimble upon energization of said solenoid to close said one valve and open said other valve said solenoid having a circuit including a normally open switch connected to be closed upon initial operation of said control valve means, a second solenoid having an armature, force transmitting means connected between such armature and said thimble and including a coil spring having mechanical connection with said thimble, and a circuit for said second solenoid including a manually operable switch.

12. In a tractor trailer brake system, manually operable control valve means for supplying fluid pressure to the actuators for the tractor brakes, a service line having a forward end connected to be supplied with pressure from said control valve means upon operation thereof, said service line having a rear end on the trailer, means connected to the rear end of said service line to be operated by pressure therein to operate the trailer brake actuators in proportion to the degree of such pressure, and an automatic valve mechanism comprising a body having a first chamber connected to the forward end of said service line, a first diaphragm forming one end of such chamber, a second diaphragm forming the other end of such chamber and provided axially thereof with a rigid element, a second chamber in axial alignment with said first chamber and having one end thereof formed by said first diaphragm, a thimble carried by said first diaphragm in contact with said rigid element and having a bore normally connecting said chambers, a normally open valve in said second chamber provided with an axially extending stem, a pressure chamber having a port surrounding said axial stem, a normally closed valve in said pressure chamber fixed to said stem whereby movement of said thimble in one direction closes said first valve around said duct and opens said second valve, and solenoid means connected to be operated upon initial operation of said control valve means for moving said thimble in said direction.

13. A system according to claim 12 wherein said solenoid means comprises a solenoid having an armature, and a spring connected between said armature and said rigid element for effecting said movement of said thimble.

14. A system according to claim 13 provided with a second solenoid in axial alignment with said first solenoid and provided with an armature, and resilient means for transmitting force from such armature to said rigid element to assist said first solenoid in moving said thimble.

15. A system according to claim 13 provided with a second solenoid in axial alignment with said first named solenoid and provided with a second armature, said first named armature having an axial bore therethrough, a rod extending through such bore and through said rigid element into direct contact with said thimble, and a spring arranged between said second armature and said rod to transmit force therethrough to said thimble to assist said first named solenoid in effecting said movement of said thimble.

16. In a tractor trailer brake system including control valve means on the tractor, a source of pressure, and brake actuating means on the tractor and trailer, in combination, an intensifying valve on the trailer, said intensifying valve being connected to the control valve means to receive a pressure signal therefrom, fluid pressure transmitting means from the source of pressure to said intensifying valve, fluid pressure transmitting means from said intensifying valve to the brake actuating means on the trailer, said intensifying valve being adapted to transmit a pressure signal from the control valve means to the brake actuating means, a solenoid arranged to operate said valve to boost the pressure signal to the brake actuating means, and fluid pressure operable means to energize said solenoid in response to a weak pressure signal from the control valve means, said solenoid having a movable part for actuating said intensifying valve, and resilient means engaging said movable part and said intensifying valve to transmit the actuating force from said movable part to said intensifying valve.

17. The construction as claimed in claim 10, a second solenoid to augment the force of said first-named solenoid having an armature, and mechanical means connected between said armature and said intensifying valve, and switching means to connect said second solenoid in parallel with said first-named solenoid.

References Cited in the file of this patent
UNITED STATES PATENTS

| | | |
|---|---|---|
| 2,444,190 | Fitch | June 29, 1948 |
| 2,985,489 | Stelzer | May 23, 1961 |
| 3,001,831 | Stelzer | Sept. 26, 1961 |
| 3,068,050 | Pekrul | Dec. 11, 1962 |